United States Patent

[11] 3,554,403

| [72] | Inventor | Gary D. Ginther<br>Leonard, Mich. |
|---|---|---|
| [21] | Appl. No. | 767,666 |
| [22] | Filed | Oct. 15, 1968 |
| [45] | Patented | Jan. 12, 1971 |
| [73] | Assignee | The Clyde Corporation<br>Troy, Mich.<br>a corporation of Michigan |

[54] APPARATUS FOR DELIVERING ARTICLES INTO A PLURALITY OF TUBES
10 Claims, 9 Drawing Figs.

[52] U.S. Cl. .................................................. 221/93,
221/264, 221/278
[51] Int. Cl. .................................................. B65h 3/44
[50] Field of Search .......................................... 221/278,
93, 95, 264

[56] References Cited
UNITED STATES PATENTS

| 3,015,413 | 1/1962 | Hengel ......................... | 221/278X |
| 3,275,191 | 9/1966 | MacDonald .................. | 221/278X |
| 3,339,799 | 9/1967 | Spisak ......................... | 221/278X |

*Primary Examiner*—Samuel F. Coleman
*Attorney*—Barnes, Kisselle, Raisch & Choate

ABSTRACT: A movable shuttle has a plurality of openings, each of which is aligned in one position of the shuttle with one of a plurality of tracks and each of which is aligned in another position of the shuttle with one of a plurality of delivery passageways, each passageway being adapted to be connected with a tube. Upon movement in opposite directions, each shuttle opening alternately receives an article from a series of articles in its respective track and transfers it into alignment with its respective passageway. The shuttle is actuated by an air motor within the body of the apparatus. Compressed air is introduced behind the articles aligned with the delivery passageways to propel them into and through the tubes.

PATENTED JAN 12 1971
3,554,403
SHEET 1 OF 2
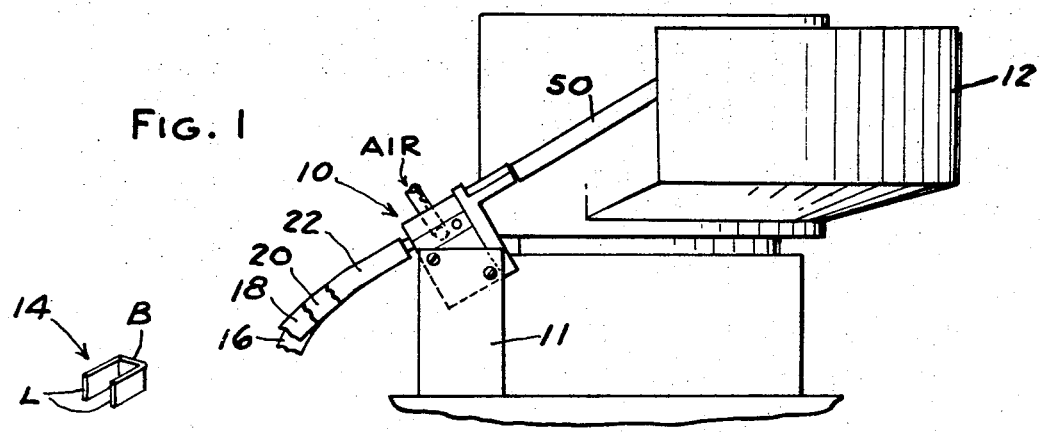
FIG. 1
FIG. 2
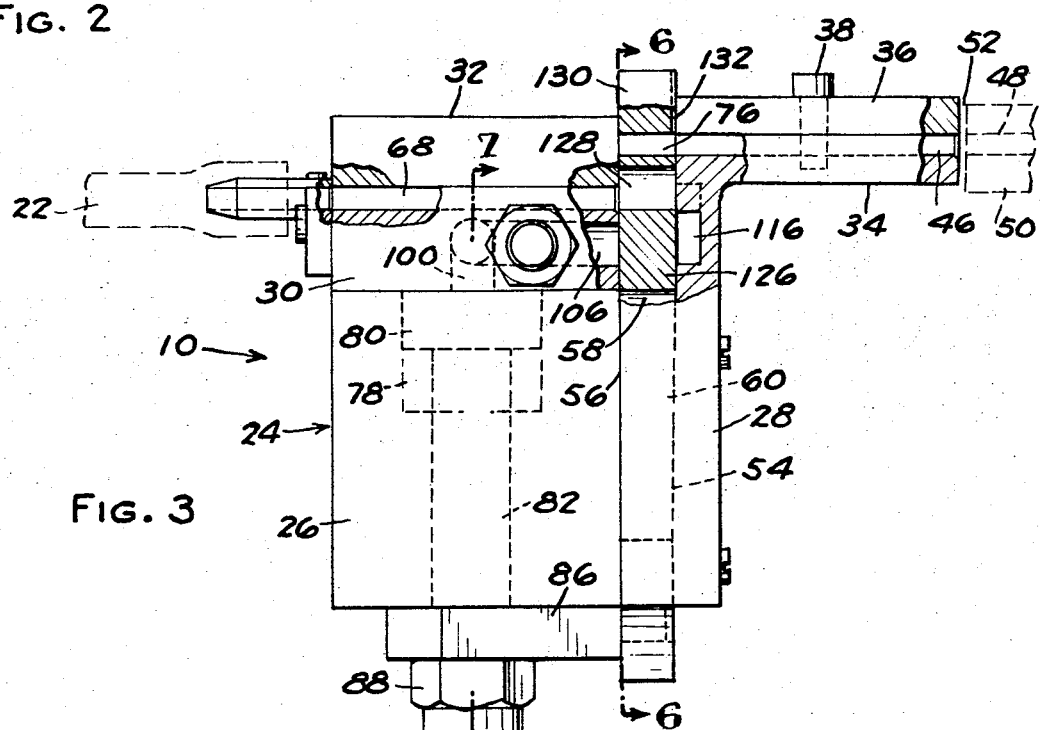
FIG. 3
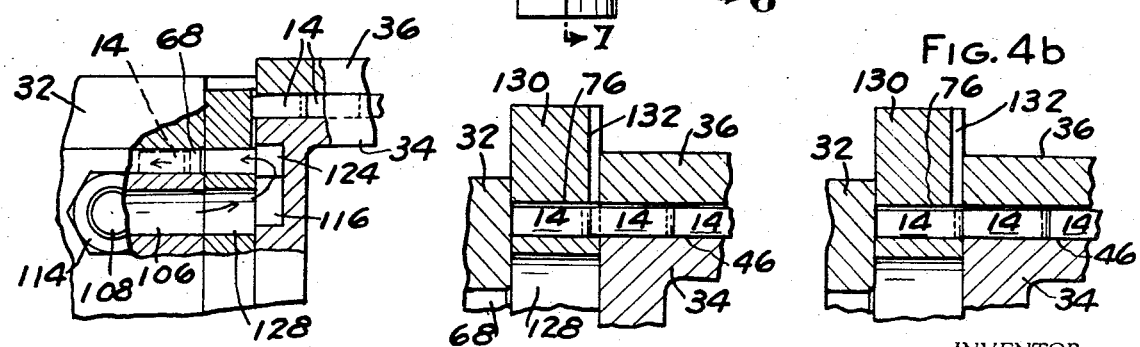
FIG. 4
FIG. 4a
FIG. 4b
INVENTOR.
GARY D. GINTHER
BY
Barnes, Kisselle, Raisch & Choate
ATTORNEYS

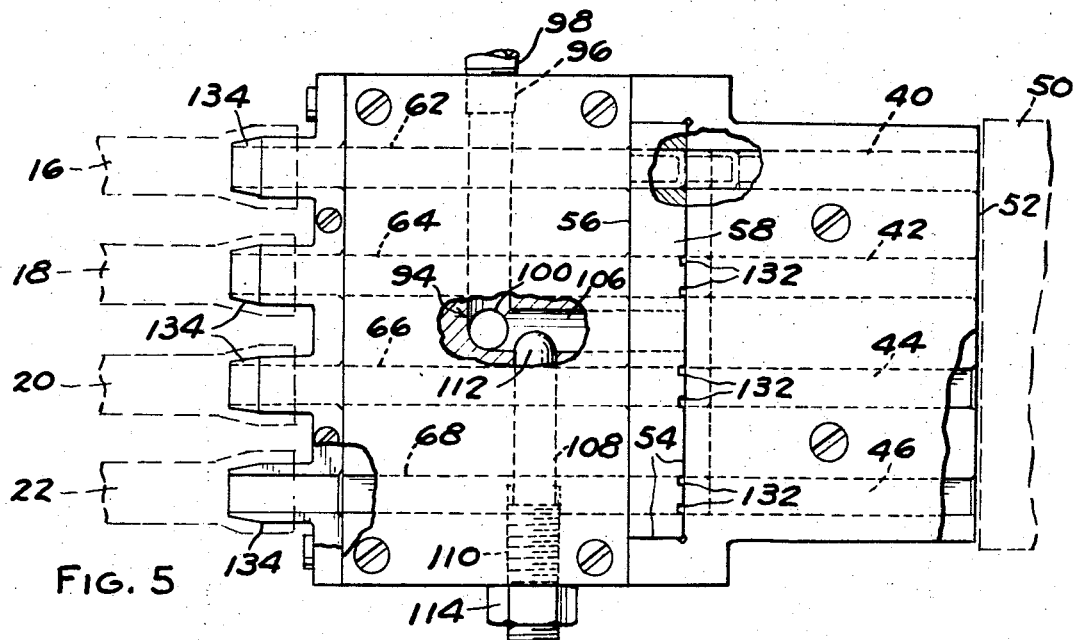
FIG. 5
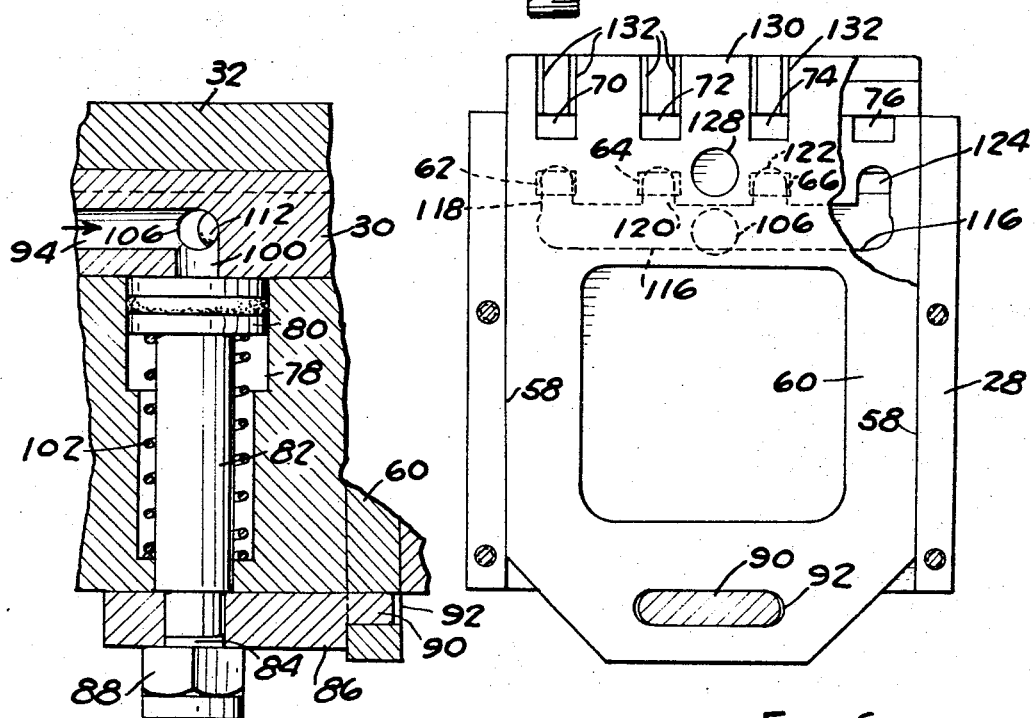
FIG. 7
FIG. 6
INVENTOR.
GARY D. GINTHER
BY
Barnes, Kisselle, Raisch & Choate
ATTORNEYS

APPARATUS FOR DELIVERING ARTICLES INTO A PLURALITY OF TUBES

The shuttle serves as a valve which admits the propelling air behind the articles only when the shuttle is in its article-delivering position. The shuttle is recessed to clear portions of articles which may bridge the junctures between the tracks and article-receiving openings to facilitate unobstructed transfer movement of the shuttle toward the article-delivering passageways.

DISCLOSURE

This invention relates generally to apparatus of the type which transfers articles one at a time from a series of articles in a track into a tube and propels the article through the tube by compressed air. More particularly, the invention involves such an apparatus having a plurality of tracks and a corresponding plurality of delivery passageways so that in each cycle of operation a single article is delivered from each one of said tracks into a corresponding one of said tubes. An example of such an apparatus is disclosed in U.S. Pat. No. 3,163,324.

The object of this invention is to provide such an apparatus having a structure which, compared to those in the prior art, is relatively simple, inexpensive, compact, and which, nevertheless, is improved to function reliably through myriad cycles of operation over long periods of time without failure or malfunction.

In general, the invention contemplates mounting the shuttle within a body having an internal cylinder and piston by which the shuttle is actuated. The body has an internal compressed air duct, one branch of which furnishes compressed air to the cylinder and another branch of which furnishes compressed air through a manifold outlet to the plurality of delivery passageways through which the articles are propelled into the tubes. The shuttle is ported to provide a valve which opens the duct to admit compressed air to the manifold outlet only when the shuttle is positioned for delivering articles to the delivery passageways. The shuttle is recessed to clear any articles which may bridge the junctures between the tracks and shuttle openings and thereby insure unobstructed movement of the shuttle to its article-delivering position. In the drawings:

FIG. 1 is a partly diagrammatic elevational view of an apparatus embodying the present invention.

FIG. 2 is a perspective view of an article with which the illustrated apparatus is adapted to be used.

FIG. 3 is a view partly in elevation and partly in section of an apparatus according to the present invention.

FIG. 4 is a fragmentary view generally similar to FIG. 3 but showing certain parts in a different position.

FIG. 4a is a fragmentary view generally similar to FIG. 3 but on an enlarged scale and showing the relation of the shuttle to articles of less than maximum tolerance length.

FIG. 4b is view similar to FIG. 4a but showing the relation of the shuttle to parts having approximately maximum tolerance length.

FIG. 5 is a top plan view of the apparatus with portions shown in section and in phantom to illustrate structural details.

FIG. 6 is a sectional view on line 6—6 of FIG. 3.

FIG. 7 is a sectional view on line 7—7 of FIG. 3.

Shown in the drawings is a feeder apparatus 10 according to this invention mounted on a stand 11 adjacent a hopper 12 illustrated as being of the vibratory type. Feeder 10 receives articles 14 from the hopper and transfers them one at a time into each of a plurality of tubes 16—22 and propels the articles through the tubes by compressed air.

Feeder 10 has a body 24 which includes a block 26 assembled as by bolting with a back plate 28, a passageway plate 30, and a cover plate 32. Back plate 28 has a rearward or upstream extension 34 provided with four longitudinally extending recesses which, in cooperation with a cover plate 36 bolted thereto as at 38, define a plurality of tracks 40—46, each of which receives a series or succession of articles 14 from similarly disposed tracks 48 in an outlet chute 50 on hopper 12. As is shown diagrammatically in the drawings, a slight discontinuity 52 is left between chute 50 and track elements 34, 36 so that hopper 12 can vibrate free of the mass of feeder 10.

Back plate 28 has a recessed portion 54 which cooperates with a face 56 of block 26 to define a guideway 58 within which a flat shuttle plate 60 moves between an upward position (FIGS. 3 and 6) and a downward position (FIG. 4).

Passageway plate 30 has a plurality of longitudinally extending slots 62—68 which cooperate with cover plate 32 to define four outlet or delivery passageways through which articles 14 are delivered into tubes 16—22 respectively. Shuttle plate 60 is provided with four openings 70—76 which, in upward position of the shuttle, align respectively with tracks 40—46 and which, in the downward position of the shuttle, align respectively with delivery passageways 62—68.

Block 24 is provided with a cavity which cooperates with a portion of passageway plate 30 to define a pneumatic cylinder 78 which contains a piston 80 having a piston rod 82 with a threaded extension 84 anchored to a crosshead 86 by a nut 88. The crosshead has a lug 90 disposed within an opening 92 in shuttle plate 60 to establish a drive connection between piston 80 and the shuttle plate. Passageway plate 30 has an internal passageway or duct 94 with an inlet 96 threaded for reception of a nipple 98 on a compressed air line. Duct 94 has a branch 100 communicating into cylinder 78. A coil spring 102 is compressed between piston 80 and an end wall of cylinder 78 (FIG. 7).

Duct 94 has a branch 106 which opens into guideway 58 for a purpose to be described. A metering screw 108 is threaded into passageway plate 30 at 110 and has an end portion 112 which projects adjustably into duct branch 106 for controlling the volume of flow of compressed air therethrough. The metering screw is locked in its adjusted position by means of a nut 114 thereon.

Back plate 28 is provided with an elongate recess 116, a portion of which is aligned with branch 106 of compressed air duct 94. Recess 116 has four branches 118—124 aligned respectively with delivery passageways 62—68.

Shuttle plate 60 has a portion 126 which, in upward position of the shuttle, forms a pneumatic closure between branch 106 of the compressed air duct and recess 116 (FIG. 3). The shuttle plate has a port 128 which, in downward position of the shuttle plate, is aligned between branch 106 and recess 116 (FIG. 4). Shuttle plate 60 has a portion 130 which extends upwardly, as the drawings are viewed, from openings 70—76 therein. Above each of these openings, plate portion 130 is provided with a pair of vertical spaced-apart slotlike recesses 132 for a purpose to be described.

An outlet fitting 134 is aligned with the downstream end of each of the delivery passageways 62—68 and these fittings are adapted for connection with tubes 16—22.

In use, it may be assumed that hopper 12 is in operation and that a succession of articles 14 has been delivered through chute 50 into each one of tracks 40—46. Air in cylinder 78 is at atmospheric pressure, and spring 102 holds piston 80 and shuttle plate 60 in an upward position as the drawings are viewed so that openings 70—76 in the shuttle plate are aligned respectively with tracks 40—46. The lead article 14 in each of the tracks thus enters one of the shuttle plate openings.

To actuate the shuttle plate, air under pressure is introduced into air duct 94 by suitable conventional controls (not illustrated). The compressed air passes through branch 100 into cylinder 78, thereby forcing piston 80 downwardly against the action of spring 102. The piston, through crosshead 86, carries shuttle plate 60 downwardly from the position of FIGS. 3 and 6 to the position of FIG. 4, thereby transferring openings 70—76 and articles 14 therein from alignment with tracks 40—46 respectively into alignment with delivery passageways 62—68 respectively. Initially, shuttle plate closure portion 126 prevents the flow of compressed air from duct branch 106 into recess 116. However, when the shuttle plate attains its downward position, closure 126 is shifted out of alignment with branch 106 and port 128 in the shuttle plate is brought into alignment between branch 106 and recess 116. Compressed air thereupon flows through recess 116 and branch recesses 118—124 to shuttle plate openings 70—76 respectively. The articles 14 therein are forced by the compressed air out of these openings through passageways 62—68 respectively aligned therewith, and into the respective tubes 16—22. The articles are propelled by the compressed air through the tubes to the desired delivery points.

It will be noted that recess 116 and its branch recesses 118—124 may be regarded as a manifold compressed air outlet at the downstream end of duct 94. Also, when port 128 in the shuttle plate is aligned between duct branch 106 and recess 116, a portion of guideway 58 for the shuttle plate forms a portion of the compressed air passageway between inlet 96 and the manifold outlet.

When articles 14 have been delivered through tubes 16—22, the controls referred to are actuated to relieve the air pressure in cylinder 78. Spring 102 thereupon returns piston 80 and shuttle plate 60 upwardly as the drawings are viewed to the position of FIGS. 3 and 6. Closure 126 again closes the portion of the compressed air passageway between branch 106 and outlet manifold 116—124. Openings 70—76 in the shuttle plate are returned to alignment with tracks 40—46 and the lead article in each of the tracks enters the respective shuttle plate opening. When compressed air is again introduced into and relieved from cylinder 78, the cycle of operation described above repeats.

The volume of compressed air which is used to propel articles 14 into and through tubes 16—22 is regulated by means of metering screw 108. To decrease this volume, the metering screw is turned to project its end 112 further into branch passageway 106; and to increase this volume, the screw is turned to retract end 112 with respect to branch 106. After each adjustment, nut 114 is tightened on the metering screw to lock the same in its adjusted position.

The length of an article 14 measured in the direction longitudinal of tracks 40—46 and through the thickness of shuttle plate 60 customarily varies between maximum and minimum tolerance dimensions. If an article 14 entering one of the shuttle plate openings 70—76 has maximum tolerance dimensions, the succeeding article in the respective track will be prevented from entering the shuttle plate opening even slightly but to the contrary will be kept entirely out of the opening as s illustrated in FIG. 4b.

However, if an article 14 within one of the shuttle plate openings has a length which is less than the maximum tolerance length, it will not fill the opening throughout the entire thickness of shuttle plate 60. The succeeding article 14 will be permitted to enter the opening slightly and bridge the juncture between the shuttle plate and its guideway (FIG. 4a). Were it not for recesses or slots 132, this juncture-bridging would lock the shuttle plate against transfer movement from the FIG. 3 position to the FIG. 4 position upon introduction of compressed air into cylinder 78. However, recesses 132 provide openings which clear the legs L of a juncture-bridging article and permit the shuttle plate to move downwardly.

Recesses 132 are provided with whatever configuration may be necessary to clear the leading edge of an article which might bridge the juncture between a track 40—46 and an opening 70—76. For example, if articles 14 were being fed with their bight portions B foremost instead of their leg portions L, then instead of providing two spaced-apart slots 132 above the openings, there would be provided a continuous groove having a width slightly greater than the bight end of the article. For another example, if an article had a trident forward end, then three slots such as those shown at 32 would be provided above openings 70—76; for an article having a single central forward projection, a single central upward slot would be provided; for an article having a curviform leading edge, the recessing could be complementarily curviform or could be configured in any manner suitable to receive the curviform forward edge.

The use of recessing such as that shown at 132 in the shuttle plate facilitates close control of the attitude of an article being fed through the apparatus and at the same time insures free movement of shuttle plate 60 for transferring the articles from tracks 40—46 to delivery passageways 62—68. By utilizing shuttle plate 60 itself as a valve member to control the flow of air between duct inlet 96 and the manifold outlet 116—124, the structure is greatly simplified and reduced in size and cost. In general, a feeder 10 according to the present invention in actual commercial use operates through many thousands of cycles, hour after hour, and literally day after day without failure or malfunction.

I claim:

1. In an apparatus having a shuttle with a plurality of openings, each aligned in one position of said shuttle with one of a plurality of tracks, and each aligned in another position of said shuttle with one of a plurality of passageways adapted for respective connection with a plurality of tubes, said apparatus being operable to transfer articles from a series thereof in each track, one at a time, into one of said passageways, said apparatus including means for introducing compressed air into said passageways to propel articles therein through said tubes, improved structure which comprises:

a body provided with means defining said passageways;

compressed air duct means in said body having an inlet, a manifold outlet positioned to introduce air into said passageways, and a portion between said inlet and outlet;

motor means operable by compressed air upstream of said duct portion to move said shuttle from said one position to said other position;

said shuttle having a portion which, in said one position thereof, pneumatically closes said duct portion; and said shuttle having a port which, in said other position thereof, registers with said duct portion, and thereby places said inlet and outlet in pneumatic communication.

2. The improved structure defined in claim 1 wherein, in said other position of said shuttle, said openings therein are aligned between said passageways and manifold outlet so that articles in said openings are propelled by air into said passageways.

3. The improved structure defined in claim 1 wherein said openings are arrayed in one direction and path of movement of said shuttle between said positions thereof is lateral of said direction.

4. The improved structure defined in claim 3 wherein said port is laterally offset from said array of openings.

5. The improved structure defined in claim 1 wherein said body has an internal guideway within which said shuttle moves, said inlet being on one side of said guideway, said manifold outlet being defined by recessing in said body on the other side of said guideway, a portion of said guideway providing said portion of said duct.

6. The improved structure defined in claim 5 wherein said body comprises two members secured together and defining said guideway, one of said members containing said inlet and the other member containing said recessing.

7. The improved structure defined in claim 1 wherein:

said body has two members which cooperate to define a guideway, said shuttle comprising a substantially flat plate movable in said guideway;

one of said members containing said inlet on one side of said plate, the other of said members being provided with recessing on the other side of said plate which defines said manifold outlet;

a portion of said guideway defining said portion of said duct means;

said openings in said other position of said shuttle being aligned between said passageways and manifold outlet so that articles in said openings are propelled by air into said passageways; and said motor means comprising an internal cavity in said one body member defining a pneumatic cylinder and a piston in said cylinder operably connected with said shuttle, said duct means having a branch which pneumatically intercommunicates said inlet and cylinder.

8. The apparatus defined in claim 1 wherein each of;

said openings has a dimension in a direction longitudinal of its respective track which is great enough to receive, in its entirety, an article having a maximum tolerance length in said direction;

said shuttle having a recessed portion extending away from each of said openings in the direction opposite to the direction of movement of said shuttle from said one position to said other position;

each recessed portion having a depth in said longitudinal direction which is at least as great as the difference between the maximum and minimum tolerance lengths of articles with which said apparatus is adapted to be used; and so that each of said recessed portions clears a second article which bridges the juncture between the respective track and opening incidental to an article of less than maximum tolerance length being received in the respective opening, whereby to facilitate transfer movement of said shuttle.

9. The improved structure defined in claim 1 wherein said motor means comprises a pneumatic cylinder within said body and a piston therein operably connected with said shuttle, said duct means having a branch which pneumatically intercommunicates said inlet and cylinder.

10. The improved structure defined in claim 9 wherein an adjustable air flow metering valve is disposed between said branch and said duct portion.